United States Patent [19]

Greeneich et al.

[11] 4,110,662
[45] Aug. 29, 1978

[54] THIN-FILM ANALOG VIDEO SCAN AND DRIVER CIRCUIT FOR SOLID STATE DISPLAYS

[75] Inventors: Edwin W. Greeneich, Plum Borough; Juris A. Asars, Murrysville, both of Pa.

[73] Assignee: Westinghouse Electric Corp., Pittsburgh, Pa.

[21] Appl. No.: 695,676

[22] Filed: Jun. 14, 1976

[51] Int. Cl.² .................. H05B 33/12; H05B 39/06; G06F 3/14; H04N 5/66

[52] U.S. Cl. .................. 315/169 TV; 340/324 M; 358/241

[58] Field of Search .................. 340/324 M, 166 EL; 315/169 TV, 169 R; 358/241, 240

[56] References Cited

U.S. PATENT DOCUMENTS

| | | | |
|---|---|---|---|
| 3,493,812 | 2/1970 | Weimer | 315/169 R |
| 3,716,658 | 2/1973 | Rackman | 315/169 TV |
| 3,749,972 | 7/1973 | DeJule | 315/169 R |
| 3,787,834 | 1/1974 | Elliot | 315/169 TV |
| 3,793,629 | 2/1974 | Sharpless | 340/324 M |
| 3,838,209 | 9/1974 | Tsuchiya | 315/169 TV |
| 3,885,196 | 5/1975 | Fischer | 340/166 EL |
| 3,909,788 | 9/1975 | Kaelin et al. | 358/241 |
| 4,006,298 | 2/1977 | Fowler et al. | 358/240 |
| 4,006,383 | 2/1977 | Luo et al. | 340/166 EL |
| 4,024,531 | 5/1977 | Ashby | 340/324 M |

*Primary Examiner*—Howard A. Birmiel
*Attorney, Agent, or Firm*—W. G. Sutcliff

[57] ABSTRACT

A thin film electronic device is detailed for processing information signals and storing line-at-a-time assembled information signals for driving an X-Y matrix coincidence addressable, display panel. The thin film device is preferably integrally formed on the periphery of the display panel and acts as a serial to parallel converter to process the information signal to present it for line-at-a-time addressing. The device is usable for alpha numeric and refresh signals as well as for TV rate video information.

4 Claims, 5 Drawing Figures

THIN-FILM ANALOG VIDEO SCAN AND DRIVER CIRCUIT FOR SOLID STATE DISPLAYS

BACKGROUND OF THE INVENTION

The recent development of large-area, flat-screen display panels opens a new dimension in the dissemination of alpha numeric and TV video information. Conventional cathode ray tube (CRT) displays utilize a scanning electron beam to address individual picture "points" on the screen. In the solid-state flat-panel display, addressing of individual points is accomplished by electronically selecting appropriate conducting bus bars which carry the required electrical signals to a matrix of "picture" elements located on the display surface.

A typical flat-panel display consists of a rectangular matrix of light-emitting or light-controlling elements, each element having associated with it a controlling circuit, located on a one-for-one basis next to the element. A cross grid of conducting bus bars is used to connect the individual picture elements to the "outside world" addressing system. Rather than having a single bus bar for each element, a coincidence addressing scheme is used whereby all elements in a given row are connected to one bus bar while all elements in a given column are connected to a bus bar running at right angles to the row bus bars. With this technique a panel containing a matrix of $m$ by $n$ elements would require $m+n$ interconnections instead of $m \times n$. Signals applied simultaneously to one row and to one column addresses the element located at the intersection of the two bus bars. In this manner the entire display panel is addressed by scanning all the row and column bus bars.

While the X-Y addressing scheme described above greatly reduces the number of panel interconnections, a cable containing in excess of 1,000 wires would be required to interconnect a panel having full TV resolution of say 500×500 lines. The need arises, therefore, to have a peripheral interface circuit which can be conveniently fashioned on, or connected to, the outer edges of the display panel which will address each of the X and Y bus bars and have a minimum number of external connecting leads. This invention discloses such a circuit.

SUMMARY OF THE INVENTION

A display information signal scan and drive means is detailed for assembling and transferring line-at-a-time display information to an X-Y matrix coincidence addressable display panel. The scan and drive means utilizes thin film transistors as switching means and thin film capacitors as storage means. A thin film transistor decoder is connected to clock means to generate sequential signals which enable the switching means which are connected to the information signal input means. The switching means transistors form parallel networks, with sequential portions of the network enabled to transfer the information signal to associated storage means, so that an entire line of information signals are assembled and stored prior to the line being transferred to the display panel.

DESCRIPTION OF THE PREFERRED EMBODIMENTS

Figure 1:
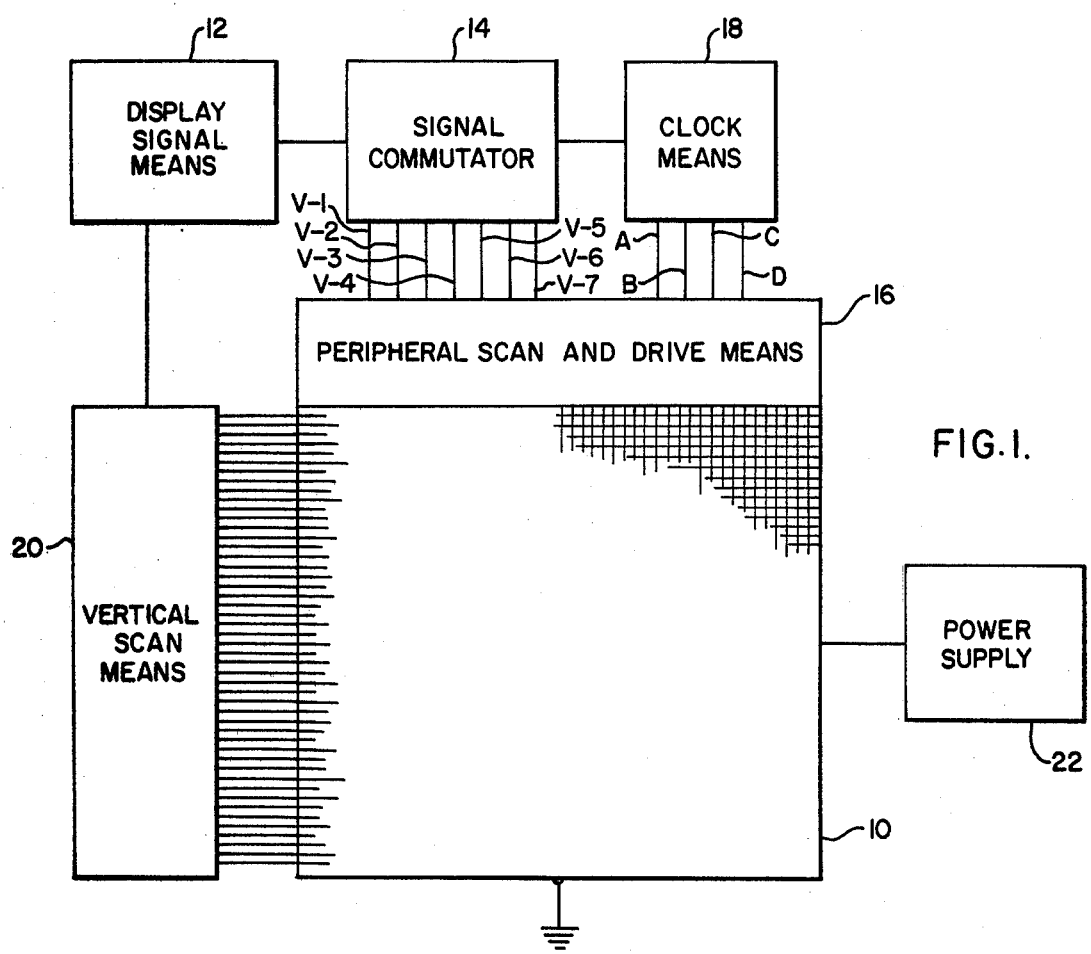
FIG. 1 is a schematic representation of a flat panel display system of the present invention.

The present invention can be best understood by reference to the drawing FIGS. 1-5. The thin film transistor controlled display panel 10 comprises a rectangular matrix of light-emitting or light-controlling elements having thin film transistor control circuitry associated with each element disposed upon a substrate. The display elements are interconnected by bus bar matrices. Such a flat display panel is described in detail in the article, "A 6×6 Inch 20 lpi EL Display," IEEE Transactions, p. 739, 1975.

The display panel can be used to display video information such as standard rate TV video signals as well as alpha-numeric information.

The display information signal means 12 is connected to an information signal commutator organizer 14 which processes the information signal and provides the desired number of parallel signal leads which are fed to the peripheral scan and drive means 16. The peripheral scan and drive means 16 serves as a signal organizer to process and organize the display input signal.

The signal commutator organizer 14 is the interface circuit between the video input signal and the scanner 16. Its function is to partition the incoming video, be it analog TV or binary alpha numeric, into seven parallel components representing seven consecutive video "points" in a given horizontal line of the displayed video. It also must change the voltage level of the seven video output signals to be compatible with the voltage requirements of the display panel. In essence, the signal commutator or organizer 14 performs a sample-and-hold function wherein the amplitude of the incoming video signal is sampled sequentially in groups of seven and presented simultaneously to the scanner.

For analog TV video information signals, the organizer or commutator 14 comprises a plurality of serial delay lines each of which is connected to sample and hold means. For the embodiment described with seven input lines for the peripheral scanner, there would be seven delay lines and sample and hold means. A clock would actuate all the sample and hold means to periodically transfer the signals held to the peripheral scanner. The video line timing signal is also fed to the vertical scanner 20.

For binary alpha-numeric information, which can be fed at much lower rates for display on the panel, a conventional ASCII 7×5 font alpha-numeric character generator system can be used to serve the function of display signal means 12 and signal commutator 14. A binary counter and decoder are connected to an ASCII character generator, such as a Signetics Silicon Gate MOS 2513 high speed character generator, to produce signals which are fed to the peripheral scanner, with the decoder also connected to the vertical scan means to synchronize the addressing of the panel.

The peripheral scan and drive means 16 is a thin film circuit which functions as a multiplexed linear array of analog switches as will be explained later. The clock means 18 supplies timing pulses which are applied to a clock gate which is part of the scan and drive means to form a decoder which sequentially addresses a desired number of information drivers.

The vertical scan means 20 synchronizes the row switching signals to the proper column signals for the coincidence activation of a row of light control elements on the panel. A vertical scan signal lead from scan means 20 is connected to each horizontal bus on the panel 10. Parallel buses extend from each display element and are commonly grounded relative to the A.C. power supply means 22 which is connected to a common light transmissive electrode disposed over the entire panel.

Figure 2:
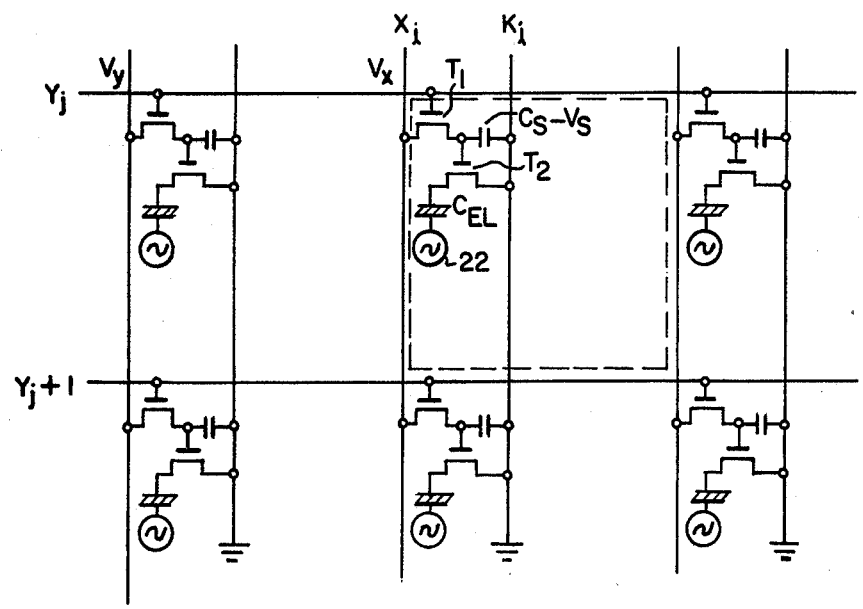
FIG. 2 is an electrical schematic for a typical display element circuit usable with the present invention.

The elemental circuit at each display element is seen in FIG. 2. A plurality of parallel buses $X_i$ extend vertically across the panel and are continued to the peripheral scan and drive means, with the information signal being applied to these buses $X_i$. The horizontal buses $Y_j$ are connected to the vertical scan means. Another parallel plurality of common buses $K_i$ permit connection of the elemental display cell to a common reference relative to the A.C. power supply. The display panel and its operation are described in greater detail in now U.S. Pat. No. 4,042,854, the teachings of which are incorporated herein. Transistor $T_1$ functions as a voltage-controlled "switch," the ON impedance of this "switch" being controlled by the potential applied to the gate bus bar $Y_j$. The drain electrode of $T_1$ is connected to bus bar $X_i$. The devices are biased such that $T_1$ conducts when positive potential is applied to the gate. Video information appearing at $X_i$ is then transferred to a storage capacitor $C_s$, located at $(X_i, Y_j)$, when $T_1$ conducts.

Transistor $T_2$ functions as a voltage-controlled "resistor," in that its impedance is determined by the potential stored on $C_s$. The value of this impedance determines the level of A.C. excitation appearing across the electroluminescent element, denoted $C_{EL}$.

The addressing system shown is a line-at-a-time system. In contrast to normal "raster" type addressing in which each element in the display field is scanned in sequence at megahertz rates, line-at-a-time addressing permits not only the display of alpha numeric information but also of video information at conventional TV rates, but with only modest performance requirements imposed upon the TFT devices. With this method, video signals (grey scale) for an entire line of display elements are first stored sequentially in an analog video register. The scanner 16 performs this function. The outputs of this register are supplied to the display panel on the vertical information buses ($X_i$) and transferred to the corresponding element storage capacitors, all at one time, when a switching pulse on the selected horizontal bus ($Y_j$) actuates all the element signal gates in that line. Introduction of the intermediate storage register $C_s$ at each display point relaxes the bandwidth requirements of the display element signal gates, as well as that of the information buses, by a factor approximately equal to the number of elements in a display line.

In simplest terms, the function of $T_1$ is to transfer the potential $V_x$ applied via bus $X_i$, appearing at the drain electrode of $T_1$ to the storage capacitor $C_s$, whenever the gate potential $V_y$ applied via bus $Y_j$ is positive. The potential $V_s$ stored on $C_s$ then controls the conduction level of $T_2$, which in turn modulates the effective A.C. potential across the electroluminescent layer.

The resultant A.C. component appearing across the electroluminescent layer is a complex function. It has been found that the grey scale is essentially only a function of the effective ON resistance of $T_2$, while the ON-OFF contrast ratio depends upon both the $T_2$ ON resistance and the OFF-leakage current.

The peripheral scan and drive means 16 functions as a multiplexed linear array of analog switches, while reducing the number of external lead connections to the display panel. The term analog refers to the ability of the circuit to accept and process input information signals of variable amplitude which can then serve to control the grey scale of each display element. The circuit also functions with two signal level binary ON-OFF alpha numeric information signals.

Figure 3:
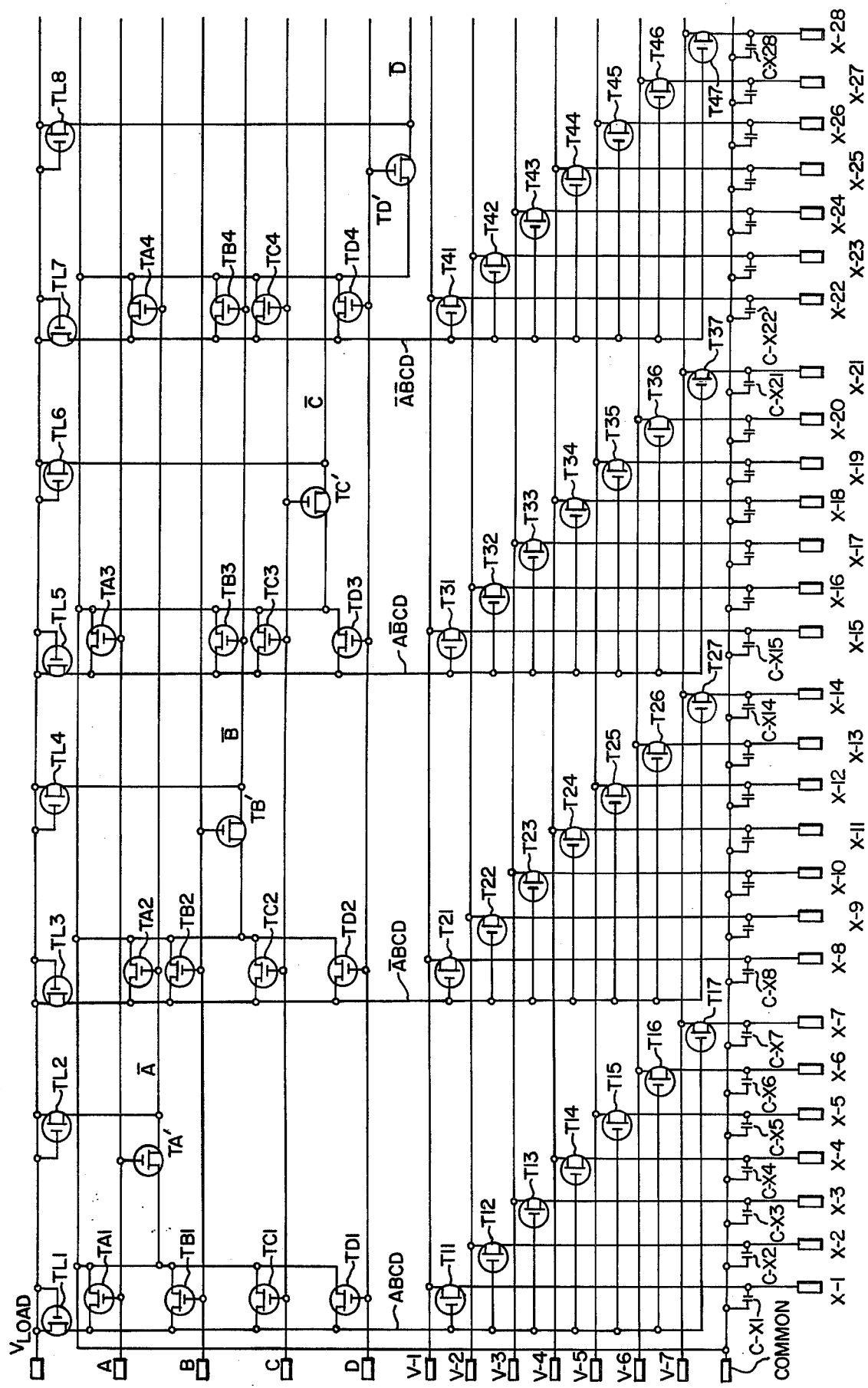
FIG. 3 is a circuit schematic of the scan and drive circuit of the present invention.

The peripheral scan and drive means 16 is seen in detail in FIG. 3, and includes a series of parallel decoder networks formed respectively by transistors TA1-TD1; TA2-TD2, etc. A decoder network is set up for each group of seven information signal gates T11-T17. The clock means 18 produces four binary clock outputs A, B, C, D which are connected to the gates of the decoder transistor networks. The parallel transistor network TA1-TD1 forms a one out of 16 decoder, which is used to address the first network of seven information signal gates of T11-T17. The information signal transistors T11-T17 are connected respectively to the information signal organizer outputs V-1 through V-7. A storage capacitor C-XN is connected between each of the information signal transistor sources and the column buses X-1 through X-N and a common bus. These column buses X-N connect with the respective $X_i$ column buses on the display panel.

Transistors TL1-TL8 are load transistors connected to a load potential and to the respective parallel decoder network, i.e. TL1 to TA1-TD1. The transistors TA'-TD' are used to generate complementary clock pulses A-D which completes a one in 16 decoder.

When the information signals are assembled simultaneously at the sources of T11-T17, and these transistors are turned on by application of a clock signal to their gates, the information signal is loaded and stored at the respective storage capacitors C-X1 through C-X7. The next information signal inputs are fed to transistors T21-T27 and the information signal loaded on capacitor C-X8 through C-X14. This is repeated until the entire line of information signals have been loaded on each of the capacitor C-XN. At that time the vertical scan means 20 provides a signal which is a synchronizing signal derived from the display signal means 12 which actuates all the switching transistors T1 for a panel row to transfer the information signal from capacitor C-XN on the peripheral circuit to the storage capacitors $C_s$ associated with the respective display element in a particular row on the panel.

Figure 4:
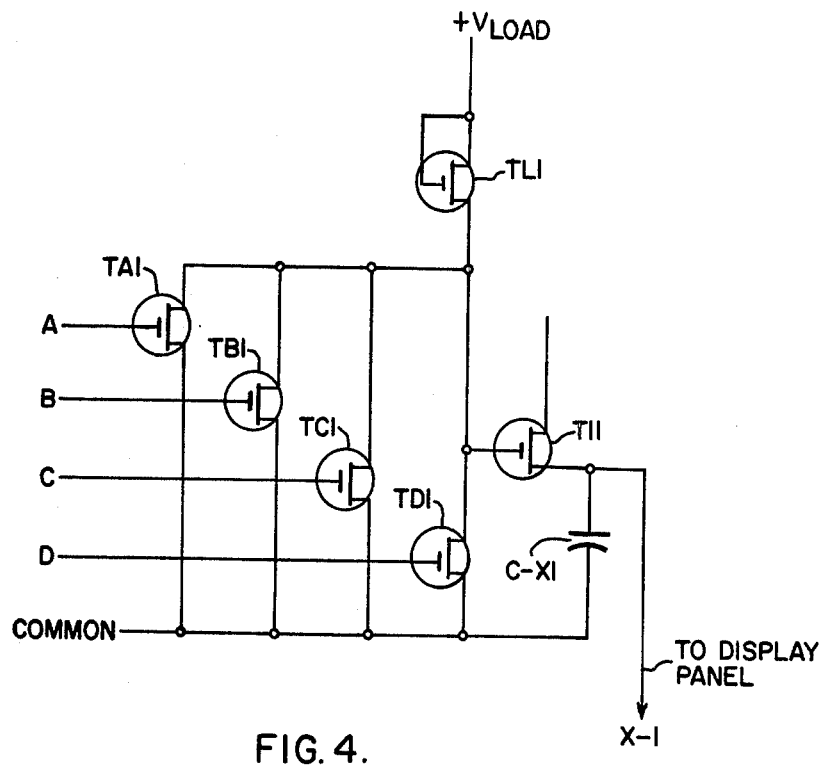
FIG. 4 is an electrical schematic representation of how the clock decoder is connected to control switching of display information signals.
Figure 5:
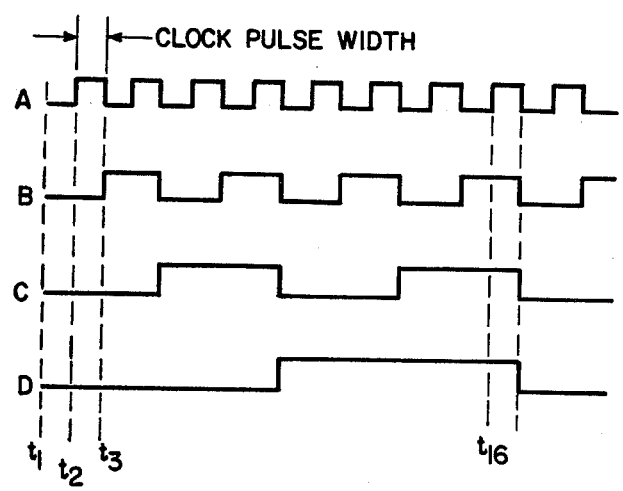
FIG. 5 is a clock output waveform diagram to illustrate operation of the clock decoder.

In FIGS. 4 and 5, a single decoder network and information switching transistor T11 are shown to demonstrate operation, with typical clock signals for the one out of sixteen decoding operation.

The peripheral scan and drive means of the present invention is preferably fabricated by deposition of thin film circuit elements on the edge of the insulating substrate which comprises the display panel. All the transistors, capacitors, leads and buses of the peripheral circuitry are thin film elements fabricated by sequential deposition of selected materials through masks.

The peripheral scan and drive means of the present invention has numerous information signal output leads *m* which correspond to the number of columns of the display panel, and has few signal input leads *n*, where $m >> n$. For a typical six inch on a side panel $m$ may be about 192, while $n$ is about 7.

The exact number of columns and rows on the display panel, and therefore the number of parallel transistor networks and information signal outputs from the peripheral scan and drive means is a matter of choice which can be widely varied depending on the resolution requirements of the panel. The number of information signal inputs to the peripheral scan and drive means can also be varied, so that if there were 5 inputs there would then be five switching transistors in each parallel network. The use of 7 such inputs makes the peripheral scan and drive means more easily compatible with standard alpha-numeric signal organizers such as the ASCII character systems which have been used already with a variety of matrix display panels such as gas discharge panels.

The thin film transistors, and other thin film components of the peripheral scanner are deposited in sequential steps in an appropriate vacuum system using an aperture mask system. The transistors are basically cadmium selenide semiconductive channel devices, with copper source and drain contacts. A thin layer of indium is typically deposited on the semiconductive channel to vary the conductivity and device characteristics. The transistor gates and the bus bars are typically aluminum, which is deposited several mils wide and about a thousand Angstroms thick. The capacitors are aluminum pads with aluminum oxide separating the pads. Aluminum oxide insulation is typically used to separate and insulate any cross-over points on the array. These film deposition techniques are well known in the art, as described in "Vacuum Deposition of Thin Films," L. Hollard, J. Wylie & Sons, N.Y., 1956. A more complete description of the film transistor technology may be had from Chapter 9 of "Field Effect Transistors," P. Weimer, Prentice Hall, Englewood Cliffs, N.J., 1966.

We claim:

1. A display information signal scan and drive means for processing line-at-a-time display signals for an X-Y matrix coincidence addressable display panel in which "$n$" information signal inputs are connected to the scan and drive means having "$m$" information signal outputs which are connected to respective X or Y panel buses and wherein $m >> n$, which scan and drive means comprises parallel networks of decoding means and switching transistor means, with individual information storage means being associated with each switching transistor means, which scan and drive means effects conversion of serial format information signals to parallel format information signals by sequential activation of switching transistor networks with "$n$" switching transistors present in each network being simultaneously actuated to transfer the information signal to the respective associated storage means, so that an entire line of information signals may be assembled and stored prior to line-at-a-time transfer to the display panel.

2. A thin film device peripheral scan and drive circuit adapted for line-at-a-time addressing of an X-Y matrix coincidence addressable display panel comprising:

decoder means connectable to clock signal means, which decoder means comprises a plurality of parallel thin film transistor networks for generating sequential enabling signals;

information switching and storage means comprising a plurality of thin film transistor parallel networks in which individual transistors in each network are connected to information signal input means with the gates of the transistor in a given network connected in common to the decoder means whereby sequential enabling signals actuates sequentially the respective parallel networks, so that information input signals are converted from serial input to parallel output signals which are stored on thin film transistor capacitors connected to each thin film transistor.

3. A thin film information handling system for converting information signals into format for scanning and driving a line-at-a-time for an X-Y addressable display panel comprising:

video signal input means which simultaneously presents a predetermined plural number of individual lines of information signal;

a plurality of common gated thin film transistor arrays with individual drains connected to the respective terminals of the information signal input means, and respective sources connected to an output signal line which includes a thin film signal storage capacitor, with the number of said common gated transistors corresponding to the number of display element columns and each signal storage capacitor is connected to a display panel column lead;

signal timing means for generating a series of switching signals at periodic intervals of a scan repetition time which is synchronized with the information signal scan time, which switching signals are applied simultaneously to plural numbers of signal switching means to transfer the information signal level applied at that time to the individual transistor to the storage capacitor so that an entire line of signal information is assembled and stored and readily simultaneously transferred to a selected line of display panel elements.

4. A flat display panel adapted to be connected to analog or digital information signal means, clock means, and synchronizing signal means comprising:

(a) X-Y thin film matrix coincidence bus addressable display portion disposed upon a substrate, with individual thin film electrical control devices connected to the buses and disposed at each coincidence display point for controlling and switching an information signal to drive a display medium at the coincidence display point;

(b) integral thin film circuit peripheral scan and drive means disposed on at least one peripheral edge of the substrate connected to the display portion and to panel input leads for processing analog or digital input information signals and storing such signals for line-at-a-time transfer to the display portion, wherein the thin film circuit peripheral scan and drive means comprises a plural stage decoder portion having a plurality of parallel connected thin film transistors comprising each stage of the plural stage decoder with thin film coupling transistors between successive decoder stages, which decoder portion is actuated by clock signals fed via panel input leads for generating timing signals which are fed to a plural stage information signal switching means, each stage of which is comprised of the number of signal switching paths corresponding to the number of information signal input leads, with each said input lead connected to one side of a thin film transistor in each stage of the information signal switching means, with the timing signal from each decoder stage fed to the gate contact of each thin film transistor in the information signal switching stage with which it is connected, and the other contact of each switching transistor is connected to a thin film signal storage capacitor and to the X or Y, column or row bus of the display portion, with the total number of information signal switching paths from all stages equaling the number of X or Y buses, and such total number of paths is much greater than the number of panel input leads.

* * * * *